United States Patent [19]

Kraines et al.

[11] Patent Number: 5,537,300
[45] Date of Patent: Jul. 16, 1996

[54] CONTROL PANEL

[75] Inventors: Bradley A. Kraines, Los Angeles; James R. Kingsbury, Lakewood, both of Calif.

[73] Assignee: Kraco Enterprises, Inc., Compton, Calif.

[21] Appl. No.: 381,756

[22] Filed: Feb. 1, 1995

[51] Int. Cl.⁶ ........................................ F21V 8/00
[52] U.S. Cl. .................. 362/86; 362/31; 362/85; 362/234
[58] Field of Search .................. 362/31, 26, 27, 362/86, 85, 234, 32, 87, 253; 455/345, 346; 340/815.74; 200/310, 311, 317

[56] References Cited

U.S. PATENT DOCUMENTS

| | | | |
|---|---|---|---|
| 2,627,685 | 2/1953 | Henry | 362/86 |
| 4,124,879 | 11/1978 | Schoemer | 362/26 |
| 4,321,655 | 3/1982 | Bouvrande | 362/29 |
| 4,322,780 | 3/1982 | Murakami et al. | 362/31 |
| 4,621,306 | 11/1986 | Sell | 362/29 |
| 4,625,263 | 11/1986 | Strohmeier | 362/32 |
| 4,722,034 | 1/1988 | Ackeret | 362/86 |
| 5,003,433 | 3/1991 | Fournier | 362/29 |
| 5,070,431 | 12/1991 | Kitazawa et al. | 362/31 |
| 5,097,396 | 3/1992 | Myers | 362/32 |
| 5,255,162 | 10/1993 | Kawamoto | 362/26 |
| 5,434,757 | 7/1995 | Kashiwagi | 362/80 |

OTHER PUBLICATIONS

Kraco product brochure having publication No. 429–258, no publication date.
Kraco product brochure having publication No. 429–383, no publication date.
Kraco product brochure having publication No. 429–440, no publication date.
Kraco product brochure having publication No. 429–461, no publication date.
Kraco product brochure having publication No. 429–506, no publication date.
Kraco product brochure having publication No. 429–507, no publication date.
Kraco product brochure having publication No. 429–519, no publication date.
Kraco product brochure having publication No. 429–578, no publication date.
Kraco product brochure having publication No. 429–579, no publication date.

*Primary Examiner*—Stephen F. Husar
*Attorney, Agent, or Firm*—Wood, Herron & Evans

[57] ABSTRACT

An illuminated control panel typically for an audio device used in an automobile. The control panel includes a front panel made of a light conducting material through which push buttons and switches extend. A light conducting diffuser extends over a substantial portion of the rear surface of the front panel. The light conducting diffuser contains a plurality of sources of light which produce a generally uniform distribution of light throughout the light conducting diffuser. The illuminated light conducting diffuser back lights the entire area of the front panel, thereby increasing the general illumination of the control panel and facilitating the location and identity of the push buttons and switches. The front panel is preferably colored to improve its general appeal and appearance. In an alternative embodiment, the control panel includes one or more trim plates that are attachable to the front panel and may be used and exchanged at the choice of the user.

31 Claims, 2 Drawing Sheets

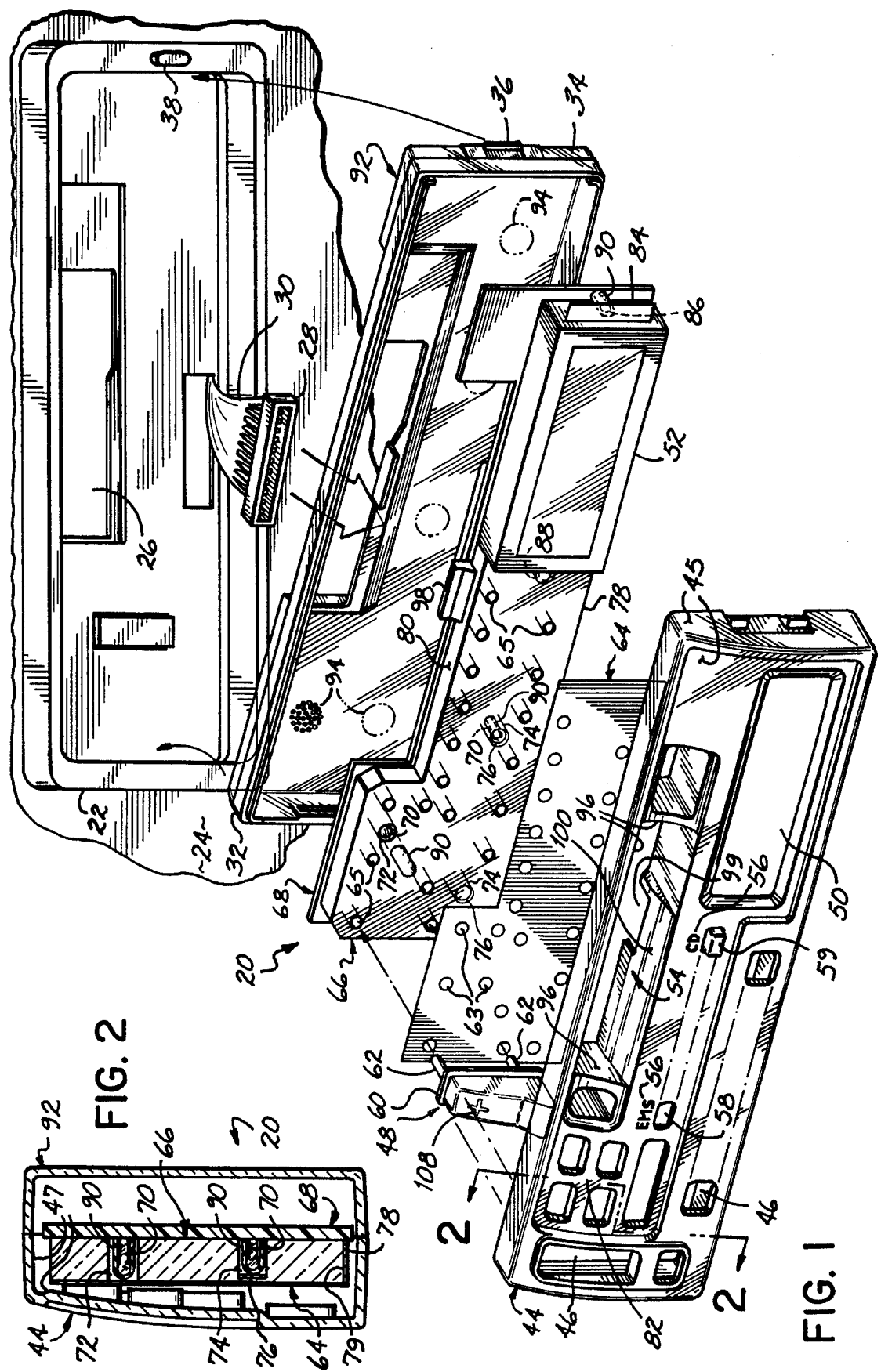

CONTROL PANEL

FIELD OF THE INVENTION

The present invention relates generally to illuminated control panels for audio devices, and more particularly to control panels with translucent or transparent backlit front panels for automotive and/or truck cassette/radio/compact disc players.

BACKGROUND OF THE INVENTION

It is a common practice to provide illumination for portions of control panels for radios and other audio devices to facilitate their use at night or during other conditions in which the ambient lighting is low. For example, it is a common practice to illuminate the tuning dial of a radio. Typically, the frequencies in the AM and/or FM bands are marked on opposed parallel scales extending longitudinally on a rectangular, transparent tuning plate. A tuning indicator is moved back and forth behind the tuning plate to the appropriate frequency, and light bulbs or other illuminating devices are used to backlight the tuning plate so that the frequency designations may be viewed at night, or under other poor lighting conditions. The tuning plate is mounted in an opaque frame in which push buttons, knobs, and other switches are mounted.

More recently, with the advent of digital technology, the control panel of an audio device has changed significantly. For example, the backlit tuning plate is replaced by a light emitting diode (LED) or liquid crystal display (LCD) panel or screen which displays the characters and other indicia corresponding to the station currently being received by the radio and other operating information. Typically, those displays are illuminated by light bulbs or other light sources located at the edges of the screen. Further, the front portion of the control panel in which push buttons, switches and the character display are mounted is made from an opaque plastic or metal material; and often, the control panel is black in color. The push buttons and switches mounted in the control panel are operatively connected to electronic devices within or behind the control panel. In order to facilitate their use at night, the push buttons are typically made of transparent "LEXAN" polycarbonate material, acrylic, or plexiglass. A label or other indicia is silk screened in wax on the front surface of the push button. The visible surfaces of the push button are then painted black or another opaque color; and thereafter, the wax is removed which leaves the shape of the label or indicia extending through the paint and onto the clear plastic front surface. Light bulbs are mounted behind the control panel and their light passes through the clear plastic push button to illuminate the labels or indicia on the front surface of the interior of the push buttons.

In use, the only light provided by the control panel is the light from the LCD character display and the light from the indicia on the push buttons. Such light is minimal; and given the number of push buttons and switches on contemporary control panels, the use of such a control panel at night, or in poor lighting conditions, has the disadvantage of being somewhat difficult to use. Further, as will be appreciated, the manufacture of an illuminated push button is time consuming, requires several manufacturing process steps, and therefore has the disadvantage of being relatively expensive.

As an alternative to illuminating indicia on the front of the push buttons, another control panel construction provides a number of cutouts immediately above or otherwise adjacent to the push buttons. Behind the opaque control panel is a plastic diffuser which is molded to have projections mating with the cutouts in the panel. Those mating projections extend through the cutouts to the front surface of the panel and are finished with the front panel surface to appear as a silver finish during the daylight. Typically, LED's are used with the diffuser to illuminate the projections with color as desired at night. Once again, those projections provide minimal illumination and have the disadvantage of being confusing and difficult to use. In addition, the manufacturing process of providing precisely mating molded pieces, as well as finishing those pieces, requires additional manufacturing steps which add cost to the manufacturing process.

SUMMARY OF THE INVENTION

To overcome the disadvantages described above, the present invention provides a control panel which permits the location of push buttons and switches to more easily be located and identified at night and in low light conditions. The control panel of the present invention is easier to use and is more pleasing in appearance.

According to the principles of the present invention and in accordance with the described embodiments, the present invention provides a control panel for a radio, tape player or other audio device with a translucent or transparent front side. A light diffuser is mounted behind and extends over a substantial area of the rear surface of the transparent front panel. A plurality of point sources of light extend into the light conducting diffuser, and the diffuser provides an area source of light which is distributed over the rear surface of the transparent front panel. A plurality of switches extend through openings in the front panel and the light diffuser. The light diffuser is effective to backlight and illuminate the entire area of the transparent front side of the control panel. Therefore, in contrast to the minimal light provided by illuminating push button indicia as shown in the prior art, the present invention illuminates the entire front of the control panel to provide a greater quantity of light. Therefore, the location of push buttons and other reference points, such as the disc/cassette-loading slot, on the front of the control panel are easier to observe, locate and actuate. For example, the loading slot for the disc and/or tape player is clearly outlined to facilitate the insertion and removal of discs or tape cassettes.

Another embodiment of the invention provides for the application of opaque labels and other indicia to the light conducting front of the control panel adjacent respective switches. By illuminating the entire front of the control panel, the opaque indicia are easy to read.

With a further embodiment of the invention, the light conducting diffuser contains a set of blind holes, each of which contains a light source. In addition, a reflective surface is applied to the end of the blind hole so that light from the source, which would otherwise be emitted through the front surface of the light conducting diffuser, is reflected back into the diffuser. Therefore, the construction of the light conducting diffuser provides a generally uniform and even distribution of light throughout the diffuser with the advantage of providing a generally uniform illumination of the front of the control panel.

In another embodiment of the invention each of the light sources has a colored tubular diffuser boot, or sleeve, which is effective to diffuse a similarly colored light throughout the light conducting diffuser, thereby illuminating the translucent or transparent front of the control panel with the colored light. The light conducting front of the control panel may be made to have a similar color tint thereby providing a uniform and evenly distributed color appearance. The color may be chosen to match colors surrounding the control panel, for example, the interior colors of an automobile, or other vehicle. The light conducting front of the control panel may be illuminated both day and night to facilitate use of the control panel and provide a uniform attractive appearance.

In a still further embodiment of the invention, the control panel includes a panel assembly having a front panel, a plurality of switches that extend through the front panel and a source of light mounted generally behind the front panel and the plurality of switches. The control panel further includes a trim plate mounted on the front panel and covering the front surface thereof. The trim plate may be made of a transparent colored material, or alternatively the trim plate may be made of an opaque material through which light does not pass. In a further aspect of this embodiment, the trim plate may be made to have a combination of opaque and transparent surfaces so that light is visible only through the transparent surfaces. The trim plate is removably mounted on the front panel so that the user can easily exchange trim plates and have a control panel of any design, color, pattern or texture. Therefore, this embodiment provides the advantage of providing a front panel to the control assembly which is almost infinitely variable and can satisfy a wide range of user choices.

These and other objects and advantages of the present invention will become more readily apparent during the following detailed description in conjunction with the drawings herein.

BRIEF DESCRIPTION OF THE DRAWINGS

FIG. 1 is a perspective disassembled view of an illuminated front panel in accordance with the principles of the present invention.

FIG. 2 is a cross-sectional view taken generally along line 2—2 of FIG. 1 and illustrates the assembled control panel.

DETAILED DESCRIPTION OF THE INVENTION

Figure 3:
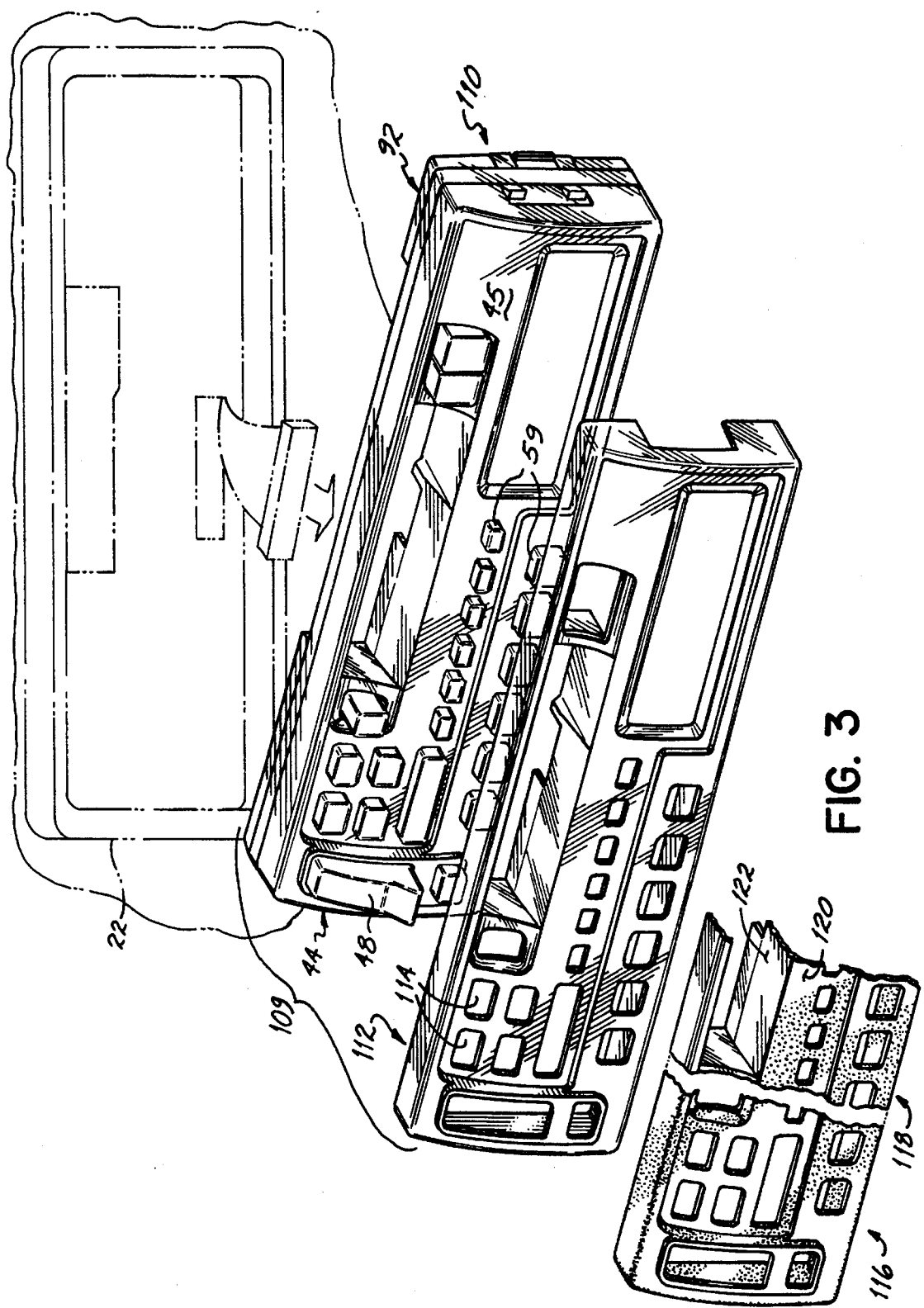
FIG. 3 is a perspective view of an alternative embodiment of the illuminated front panel.

Referring to FIG. 1, the illuminated control panel 20 of the present invention is shown in its preferable environment, that being a detachable control panel for an audio device, such as an AM-FM receiver and a media player as is typically found in automobiles, trucks, and other vehicles. The illuminated control panel 20 is selectively attachable and removable relative to a chassis 22 which is fixed in a dashboard 24, or other mounting surface. The chassis 22 has an opening 26 for receiving a tape cassette, or other recorded media, such as a compact disc, and further includes an electrical connector 28 which is connectable to a mating connector (not shown) on the illuminated control panel 20. Attached to the electrical connector 28 is a multi-conductor cable 30 having wires to supply power to the illuminated control panel 20, as well as conduct input signals from the illuminated control panel 20 and provide output signals thereto. After connecting the electrical connector 28 to the illuminated control panel 20 one end 32 of the illuminated control panel 20 is inserted into the chassis 22; and thereafter, the other end 34 of the illuminated control panel 20 is inserted into the chassis 22 until a tab 36 is engaged, thereby locking the illuminated control panel 20 in place in the chassis 22. When in that position, the illuminated control panel 20 is used to operate the radio and recorded media player. To frustrate theft of the illuminated control panel 20, push button 38 is depressed which disengages a detent (not shown) in the chassis 22 operably associated with depressible push button 38, thereby releasing the control panel 20 from the chassis 22. After disconnecting the electrical connector 28, the control panel 20 is completely separated from the chassis 22.

The control panel 20 includes a translucent or transparent front panel 44 preferably injection molded from a light conducting durable plastic, for example, "LEXAN" polycarbonate. The front panel has contiguous front surfaces 45 which are visible to the user and contiguous rear surfaces 47 (FIG. 2) which are hidden from view. The light conducting front panel 44 contains a number of through holes or openings 46 which are sized to receive control devices and switches, such as push buttons 48. The front panel 44 also has an opening 50 sized to receive a character display, such as an LCD display 52. The front panel 44 has a slot or channel 54 therethrough which is sized to receive recorded media, such as, for example, cassette tapes, CDs, etc. The front panel 44 also contains opaque labels or other opaque indicia 56 which are positioned in association with selected push button openings 58 and selected push buttons 59.

The push buttons 48, 59 preferably have an opaque body that extends through one of the openings 46, 58 of the front panel 44; and further the push buttons 48, 59 have a flange 60 which holds the push buttons 48, 59 within the front panel 44. In addition, the push buttons 48, 59 have actuating pins 62 which extend through holes 63 of a diffuser 64, holes 65 of a light conducting plate 66, and operatively contact in a well known manner switch elements (not shown) which are attached to a printed circuit board 68. Depending on the physical size of the push buttons 48, they may, or may not, require auxiliary biasing means or compression springs to return them to their original position after being depressed.

Also mounted on the circuit board are a plurality of light sources, for example, incandescent light bulbs, 70 which extend into the light conducting plate 66. The light conducting plate 66 contains through holes 72 or blinds holes 74 for receiving the light bulbs 70. The purpose of the light conducting plate 66, light bulbs 70, and diffuser 64 is to convert the point sources of light provided by the light bulbs 70 into a uniform area of evenly distributed light so that the front panel 44 is backlit evenly over its entire area. Preferably, when viewing the front panel 44, locations of the light bulbs 70 are not discernable. The light conducting plate 66 is preferably injection molded from a clear plastic, for example, a clear acrylic material, so that light may be transmitted or conducted throughout the interior of the light conducting plate 66.

To further reduce the appearance of hot spots or bright spots at the locations of the light bulbs, the bulbs 70 are inserted into blind holes 74 as illustrated in FIG. 2. Further, the ends of the blind holes 74 contain a reflective coating 76, such as a spot of white paint, or other reflective material, that may be slightly transmissive of light, but is primarily effective to reflect the light from the end of the blind hole 74 back into the interior of the light conducting plate 66. Further, depending on the desired function and appearance, the bottom edge surface 78 of the light conducting plate 66 may be coated with a reflective coating 79, for example, a white paint or material to minimize illumination from the bottom edge surface of the front panel 44, and reflect that light back into the light conducting plate 66. On the other hand, it is desirable to emit light from the upper edge surface 80 of the light conducting plate 66 so that the slot or channel 54 for recorded media is completely illuminated. As can be seen in FIG. 2, in the assembled control panel, the one side of the diffuser 64 contacts and covers the large outer directed side surface 75 of the light conducting plate 66. Further, a substantial area of the rear surfaces 47 of the front panel 44 abut up against the opposite side of the diffuser 64. Therefore, light from the bulbs 70 in blind holes 74 is transmitted laterally through the light conducting plate 66. The light then passes through the diffuser 64 and the light conducting front panel 44 and illuminates the front surfaces 45 of the front panel 44.

There may be particular locations on the front panel 44 where there is a high density of push buttons, and greater light is desired. For example, at the point 82 on the front panel 44, there is a cluster of four, closely-spaced push buttons. Therefore, illumination through the front panel 44 at that point is going to be minimal. To increase the illumination at the point 82, the light conducting plate 66 contains a through hole 72 into which the light bulb 70 extends. Consequently, there is a higher intensity and greater concentration of light extending through the open end of through hole 72 which provides a greater quantity of light at point 82 on the front panel 44. Preferably, the light bulbs 70 and any associated diffuser sleeves are confined within the volume of the holes 72.

To further diffuse the light from light bulbs 70 and the front surface of the light conducting plate 66, a light diffuser 64 is located between the front surface of the light conducting plate 66 and the rear surface of the front panel 44. The light diffuser 64 is preferably made from a sheet material, for example, a polyester film. Further, the diffuser 64 is sufficiently thick that the light sources 70 do not appear as bright or hot spots; however, the diffuser 64 cannot be so thick that the light from the sources 70 is too dim. The proper thickness of the diffuser 64 is determined experimentally by viewing the illumination of the front panel 44. The optimum thickness of the diffuser 64 will vary as a function of the number, size, power and location of the light sources. A diffuser having a thickness of 0.006 inches has been found suitable for the control panel disclosed herein. Preferably, the diffuser 64 has a "frosted" appearance, that is, light passes through it, but objects are not identifiable when viewed through the diffuser 64. The material may also be used at other strategic locations, for example a small diffuser sheet 84 is located at one end of the character display 52 to diffuse light from the light source 86. The light sources 86 and 88 are effective to illuminate the front screen of the LCD display 52.

Preferably, the front panel 44 is either clear or colored, however, the front panel 44 must be non-opaque so that it conducts light through it. One of several preselected colors which may be chosen to match the colors that are typically found in the surroundings in which the illuminated front panel is used. To further enhance the diffusion of the light and to provide the desired color, each of the light bulbs 70 is covered with a diffuser boot, or closed end sleeve 90. The sleeve 90 is preferably made from a colored latex material which is chosen to match the desired color within the front panel 44. The sleeve 90 is sized to fit within the holes 72, 74 within the light conducting plate 66 and slide over the light bulbs 70. In the case of through holes 72, the sleeve 90 extends therethrough and contacts the diffuser 64.

As an assembly, the push buttons 48 are inserted from the rear within their respective openings 46, 58 within the front panel 44 until their flanges 62 abut the rear surface of the front panel 44. The pins 62 of the push buttons 48 are aligned with and inserted through the holes 63 of the diffuser 64 of the holes 65 of the light conducting plate 66. The entire assembly of the control panel 20 is held together by the front panel 44 being connected with a mating rear panel 92. The front and rear panels 44, 92 may be held together by mechanical connections, fasteners, welding, or any other appropriate mechanism. The rear panel 92 further includes patterns of ventilation holes 94 which are located at different positions on the rear panel 92 to facilitate ventilation and the release of heat from within the control panel 20. Preferably, the rear panel 92 is translucent and is injection molded from the same polycarbonate material as the front panel 44 and is colored to match the front panel 44.

In use, when the power switch is actuated, the light bulbs 70 are illuminated and provide a generally uniform, evenly distributed light across the area covered by the diffuser 64 and the front screen of the LCD display 52. Therefore, the entire surface of the front panel 44 is illuminated with a clear or colored light. Further, the back lighting of the front panel 44 permits the opaque indicia 56 to be more clearly identified and read. By providing an entire surface or area of light, the illuminated front panel 44 much more clearly defines the locations of the push buttons 48, and the channel 54 for recorded media. Therefore, the illuminated front panel facilitates use of the push buttons and switches and is less confusing and easier to use in low light conditions.

Four surfaces 96 form the slot or channel 54 which extends from the front outer directed surface of the front panel 44 in a perpendicular direction past the general plane of the rear surface of the front panel. Recorded media to be inserted into and removed from the chassis 22 is passed through the channel 54. To facilitate the location and use of the channel 54, light passes through and illuminates the sides 96. To provide additional light and further facilitate use of the illuminated front panel, the light conducting plate 66 has a clear tab 98 extending from the top surface 80 and which when assembled fits into a notch or cutout 99 and is flush with the lower surface 100 of the opening 54. Therefore, even though the front panel 44 may be colored, the tab 98 provides a source of clear light within the opening 54 thereby increasing the amount of light in that area and further facilitating the identification of the location of the opening 54 in low light conditions. Further, the circuit board on which the light sources are mounted is described as also containing the electrical contacts for the push buttons. Alternatively, the electrical contacts for the push buttons may be located elsewhere, for example, within the chassis 22. In addition, the light sources may be located in the chassis, and the light transmitted to the light conducting plate by light conducting rods that extend to the light sources in the chassis.

FIG. 3 illustrates an alternative embodiment of the illuminated control panel that permits the user to selectively change the appearance of the control panel. The control panel 109 includes a control panel assembly 110 that is substantially identical to the assembly illustrated in FIG. 2. The control panel assembly 110 includes a transparent front panel 44 and a plurality of switches 48, 59 assembled within the control assembly 110 and extending through the front panel 44 in a manner as previously described with regard to FIG. 1. The panel assembly 110 further includes a plurality of sources of light and a diffuser means both of which are not shown in FIG. 3, but are assembled within the panel assembly 110 in a manner as previously described with regard to FIGS. 1 and 2, but with one exception. In the embodiment of FIG. 3, the panel assembly 110 is preferably constructed to provide a non-colored, white illumination over a substantial area of the front panel, thereby back lighting the front panel and illuminating the front surface thereof. Consistent with the prior discussion with regard to FIGS. 1 and 2, that non-colored generally uniform illumination of the front panel 44 can be achieved in various ways. For example, the panel assembly 110 can be constructed without using the colored latex boots 90 illustrated in FIG. 1. Therefore, no color will be introduced in the illumination of the panel assembly 110. Alternatively, latex boots 90 may be used that have a frosty or milky translucence that is effective to pass the light from the light sources in a non-colored but diffuse manner. In view of the prior description, the light bulbs 70, the latex boots 90, the light conducting plate 66, and the diffuser 64 may be used in different combinations and be manufactured to provide different light conducting characteristics so that the front panel 44 is illuminated in a generally uniform non-colored or white-like light.

This embodiment further includes a trim plate 112 which contains a pattern of openings 114 that match the pattern of openings in the front panel 44. The trim plate 112 is sized to mount on the front panel 44, so that it fits against and lays directly on top of the front surfaces 45 of the front panel 44. Further, the trim plate 112 is preferably relatively thin but stiff enough to mate with the various contours and shapes of the front panel 44. The trim plate 112 is preferably manufactured from a "LEXAN" polycarbonate plastic by a molding process, such as injection molding and is preferably mounted or attached to the front panel 44 by known interlocking notches and tabs (not shown). In a first aspect of this embodiment, the trim plate 112 is preferably made from a light conducting, that is, transparent, colored material so that light is carried or conducts through it. Further, the user may have several trim plates 112 of different colors and can easily detach one and mount another to suit the desires at any particular time.

In another aspect of this embodiment, the trim plate may be made of a totally opaque material as illustrated by the trim plate 116 of Fig. 3. Alternatively, in another aspect of this invention, the trim plate 118 may include opaque surfaces 120 through which light does not pass; and light from light sources within the panel assembly 110 are not visible. In addition, the trim plate 118 may also have transparent surfaces 122 through which light from the light sources in the panel assembly 110 are visible. In addition, the trim plates 112, 116, 118 may be manufactured to have a variety of surface textures and different surface designs, for example, stripes, wood grains, etc. Therefore, the variety of trim plates is almost infinite, and the user is able to select any one or several of available trim plates as the user desires at any time. Consequently, if the control panel is used in association with chassis 22 that are located in different vehicles or other environments, the user can choose different trim plates 112, 116, 118 to match the decor and color of those different environments.

While the invention has been set forth by a description of the embodiment in considerable detail, it is not intended to restrict or in any way limit the claims to such detail. Additional advantages and modifications will readily appear to those who are skilled in the art. For example, the front panel 44 and trim plates 112, 116, 118 are not limited to its use in detachable control panels or for vehicular purposes. The construction of the described control panels is applicable to any audio device or appliance, regardless of its use. While the front and rear panels 44, 92 and trim plates 112, 116, 118 are preferably injection molded from "LEXAN" polycarbonate, any other material that conducts, transmits or conveys light may be used, for example, alternative plastics include acrylic or plexiglass.

With the present invention, the light conducting diffuser is made up of a light conducting plate 66 and a separate diffusing material 64. Alternatively, the front or forward surface of the light conducting plate 66 may be etched or coated with a translucent material which has a similar diffusing effect as the diffuser 64. Further, different colors may be achieved by using light bulbs 70 of one color, diffusers 90 of another color, and having a front panel that is clear, or further yet, a third color. Alternatively, the point sources of light may be LED's, incandescent light bulbs or any other point source of light. Using LEDs as the point sources of light also provide an alternative source of color and may be switchable between an amber and a green color. Further, those colors may be filtered and/or transmitted through the light conducting plate 66 to the front panel 44. In addition, the number and location of the light bulbs 70 are dependent on the desired illumination of the front panel 44, and are also dependent on the type, size, location and density of the push buttons 48.

Further, the light conducting front panel 44 which includes opaque indicia 56 permits the use of a solid opaque push button 59 which does not require the extensive and expensive manufacturing process to put an internally lighted label on the front of the push button. Further, the push button 59 may be made from a colored material less expensive than the clear "LEXAN" polycarbonate used to make illuminated push buttons. Alternatively, an illuminated push button 48 may also be used. With the push button 48, light passes from the light conducting plate 66, through the translucent pin 62 and through the inside of the body of the push button 48 and shine through indicia 108 on the front surface of the push buttons 48.

Instead of being made with the preferable transparent material, alternatively, the rear panel 92 may be made from an opaque material such as that used in the prior art devices. As will be appreciated, the control panel assembly 110 of FIG. 3 may have alternate constructions depending on the nature of the trim plates used. For example, if opaque trim plates 116 are to be used with the panel assembly 110, the front and rear panels of that panel assembly may be made from opaque materials as opposed to transparent materials. Accordingly, departures may be made from the details described herein without departing from the spirit and scope of the invention.

What is claimed is:

1. A control panel for a radio comprising:

a transparent front panel having a rear surface, a front surface and openings therethrough and adapted to be mounted to the radio;

a plurality of light bulbs providing point sources of light;

diffuser means having first openings sized to receive the plurality of light bulbs and second opening matching the openings in the front panel, the diffuser means extending over a substantial area of the rear surface of the transparent front panel to provide a generally uniform source of light;

a plurality of switches extending through the openings in the transparent front panel and the matching openings in the diffuser means; and the front panel having an illuminated front surface being luminous over substantially the entirety of the front surface in response to the plurality of light sources and the diffuser means back lighting a portion of the rear surface of the front panel with the generally uniform source of light, whereby the illuminated front surface provides a lighting contrast with the plurality of switches to facilitate use of the plurality of switches.

2. The control panel of claim 1 further comprising a trim plate mounted on the transparent front panel and covering the front surface.

3. The control panel of claim 2 wherein the trim plate is made from a transparent colored material so that light from the sources of light is visible through the trim plate.

4. The control panel of claim 2 wherein the trim plate is made from an opaque material so that light from the sources of light is not visible through the trim plate.

5. The control panel of claim 2 wherein the trim plate includes opaque surfaces and transparent surfaces so that light from the sources of light is visible through the transparent surfaces and is not visible through the opaque surfaces.

6. A control panel for an audio device comprising:

a front panel made of a light conducting material having openings therethrough and adapted to be mounted to the audio device;

a light conducting diffuser mounted adjacent to and extending over at least a portion of a rear side of the front panel, the light conducting diffuser having openings matching the openings in the front panel;

a plurality of light sources having one end extending into the light conducting diffuser, the plurality of light sources in combination with the light conducting diffuser providing a generally uniform source of light;

a plurality of switches extending through the openings in the front panel and the matching openings in the light conducting diffuser; and the front panel having an illuminated front surface being luminous over substantially the entirety of the front surface in response to the plurality of light sources and the light conducting diffuser back lighting a rear surface of the front panel with the generally uniform source of light, whereby the illuminated front surface provides a lighting contrast with the plurality of switches to facilitate use of the plurality of switches.

7. The control panel of claim 6 wherein the front panel includes opaque indicia applied thereto in association with ones of the plurality of switches and the back lighting of the front panel provides a lighting contrast with the opaque indicia to clearly identify the opaque indicia.

8. The control panel of claim 6 wherein the light conducting diffuser further comprises:

a light conducting plate; and a light diffusing surface on one side of the light conducting plate adjacent the rear surface of the front panel.

9. The control panel of claim 6 wherein the light conducting diffuser is a transparent member.

10. The control panel of claim 8 wherein the light conducting plate is a clear transparent member.

11. The control panel of claim 8 wherein the light diffusing surface is a frosted surface.

12. The control panel of claim 8 wherein the light diffusing surface is on a polyester film.

13. The control panel of claim 6 wherein the light conducting diffuser further comprises:

at least one blind hole extending from a rear side of the light conducting diffuser, the one blind hole receiving one of the plurality of light sources.

14. The control panel of claim 13 further comprising a reflective element located adjacent a closed end of the blind hole to reflect light from the closed end of the blind hole back into the light conducting diffuser.

15. The control panel of claim 6 wherein the light conducting diffuser further comprises at least one through hole extending between the rear and a front side of the light conducting diffuser, the one through hole receiving one of the plurality of light sources.

16. The control panel of claim 6 further comprising diffusers located between the plurality of light sources and the light conducting diffuser.

17. The control panel of claim 16 wherein the diffusers comprising light conducting tubular sleeves extending over the plurality of light sources to diffuse the light therefrom prior to the light entering the light conducting diffuser.

18. The control panel of claim 17 wherein the diffusers comprise a light conducting colored material.

19. The control panel of claim 6 wherein the front panel is a light conducting colored material.

20. The control panel of claim 6 wherein ones of the plurality of push buttons are made from an opaque material.

21. The control panel of claim 6 further including an opening sized to receive recorded media, the opening being formed by a plurality of surfaces on the front panel, the plurality of surfaces conducting light from the light sources, thereby illuminating the opening to facilitate inserting and removing recorded media from the opening.

22. The control panel of claim 21 wherein the light conducting diffuser includes a tab extending from an edge thereof and through a cut out in one of the plurality of surfaces, thereby illuminating the opening with a clear light.

23. A detachable control panel for a radio receiver comprising:

a front panel made from a light conducting material and having opaque indicia applied thereto, the front panel containing openings extending therethrough;

a light conducting plate mounted adjacent to and extending over a portion of a rear side of the front panel, the light conducting plate having openings matching the openings in the front panel;

a light diffuser mounted between a front side of the light conducting plate and the rear side of the front panel, the light diffuser have opening extending therethrough matching the openings in the light conducting plate and the front panel;

a circuit board located adjacent a rear side of the light conducting plate;

a plurality of light sources mounted at different positions on the circuit board, each of the plurality of light sources having one end connected to a power source on the circuit board and having an opposite end extending into the light conducting plate;

tubular light diffusing sleeves extending over the plurality of light sources within the light conducting plate;

a character display mounted on the circuit board adjacent the light conducting plate, at least one of the sources of light being mounted adjacent the character display for illuminating a front surface of optical character display;

a plurality of opaque switches extending through the openings in the front panel, the openings in the light diffuser and the openings in the light conducting plate, the plurality of opaque switches operatively contacting switch elements on the circuit board; and a rear panel connected to the front panel and enclosing therebetween the light conducting plate, the light diffuser, the plurality of light sources, the diffusing sleeves, the circuit board, the character display, and the plurality of opaque switches, the light sources providing a generally uniform illumination of the character display and the front panel behind, the illumination of the front panel contrasting with the indicia thereon and contrasting with the plurality of opaque switches to more clearly identify the indicia and the locations of the plurality of opaque switches.

24. A control panel for an audio device comprising:

a panel assembly including a front panel having a rear surface, a front surface and an opening therethrough and adapted to be mounted to the audio device, a light conducting diffuser mounted adjacent to and extending over at least a portion of a rear side of the front panel;

a switch extending through the opening in the front panel, and a source of light mounted in the panel assembly and having one end extending into the diffuser; and the front panel having an illuminated front surface being luminous over substantially the entirety of the front surface in response to the light source and the light conducting diffuser back lighting a rear surface of the front panel with a generally uniform source of light, a trim plate mounted on the front panel and covering the front surface.

25. The control panel of claim 24 wherein the trim panel is removably mounted on the panel assembly.

26. The control panel of claim 25 wherein the trim panel is made from a light conducting colored material so that light from the source of light is visible through the trim plate.

27. The control panel of claim 25 wherein the trim panel is made from an opaque material so that light from the source of light is not visible through the trim plate.

28. The control panel of claim 25 wherein the trim panel has a first surface opaque to light and a second surface conducting light therethrough so that light from the source of light is visible through the second surfaces but is invisible through the first surfaces.

29. A control panel for an audio device comprising:

a front panel made of a light conducting material having an opening therethrough and adapted to be mounted to the audio device;

a light conducting diffuser mounted adjacent to and extending over a portion of a rear side of the front panel;

a plurality of light sources having one end extending into the light conducting diffuser, the plurality of light sources in combination with the light conducting diffuser providing a generally uniform source of light backlighting the rear side of the front panel;

a switch extending through the opening in the front panel; and the front panel having an illuminated front surface being luminous over substantially all of the front surface in response to the plurality of light sources and the light conducting diffuser backlighting the rear surface of the front panel with the generally uniform source of light, the front surface being luminous over substantially all of the front surface providing a lighting contrast with the switch to identify the location of the switch.

30. A control panel for an audio device comprising:

a front panel made of a light conducting material and adapted to be mounted to the audio device;

a light conducting diffuser mounted adjacent to and extending over at least a portion of a rear side of the front panel;

a light source having one end extending into the light conducting diffuser, the light source in combination with the light conducting diffuser providing a generally uniform source of light backlighting the rear side of the front panel;

a switch accessible from the front panel; and the front panel having an illuminated front surface being luminous over substantially all of the front surface in response to the light source and the light conducting diffuser backlighting the rear side of the front panel with the generally uniform source of light, the illuminated front surface of the front panel providing a lighting contrast with the switch to facilitate use of the switch.

31. A control panel for an audio device comprising:

a front panel made of a light conducting material and adapted to be mounted to the audio device, the front panel having an opening therethrough;

a light source mounted adjacent to and extending over at least a portion of a rear side of the front panel, the light source providing a backlighting of a rear surface of the front panel;

a switch extending through the opening in the front panel; and the front panel having an illuminated front surface being luminous over substantially all of the front surface in response to the light source backlighting the rear surface of the front panel, the front surface being luminous over substantially all of the front surface to provide a lighting contrast with the switch to clearly identify the location of the switch.

\* \* \* \* \*